(12) United States Patent
Yasuda

(10) Patent No.: US 9,369,626 B2
(45) Date of Patent: Jun. 14, 2016

(54) ELECTRONIC DEVICE AND IMAGING APPARATUS THAT PREVENT PROCESSING RELATED TO AN INVALID FUNCTION

(71) Applicant: CANON KABUSHIKI KAISHA, Tokyo (JP)

(72) Inventor: Takayuki Yasuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 13/869,087

(22) Filed: Apr. 24, 2013

(65) Prior Publication Data
US 2013/0278789 A1 Oct. 24, 2013

(30) Foreign Application Priority Data

Apr. 24, 2012 (JP) .................. 2012-099271
Feb. 28, 2013 (JP) .................. 2013-039482

(51) Int. Cl.
*H04N 5/232* (2006.01)

(52) U.S. Cl.
CPC ........... *H04N 5/23222* (2013.01); *H04N 5/232* (2013.01)

(58) Field of Classification Search
CPC . H04N 5/23245; H04N 5/343; H04N 1/6086; G03B 2206/00; G03B 2206/002
USPC ............ 348/220.1, 229.1, 224.1, 222.1
See application file for complete search history.

(56) References Cited

U.S. PATENT DOCUMENTS

| 2004/0125211 | A1 | 7/2004 | Ishida | |
| 2009/0122158 | A1* | 5/2009 | Chen | G03B 13/36 348/231.99 |
| 2011/0096188 | A1* | 4/2011 | Ishida | 348/222.1 |
| 2011/0149095 | A1* | 6/2011 | Kikuchi | 348/208.4 |

FOREIGN PATENT DOCUMENTS

| CN | 102298572 A | 12/2011 |
| JP | 2009-037589 A | 2/2009 |

OTHER PUBLICATIONS

Dec. 23, 2015 Chinese Office Action, that issued in Chinese Patent Application No. 201310141488.5.

* cited by examiner

*Primary Examiner* — Nelson D. Hernández Hernández
(74) *Attorney, Agent, or Firm* — Cowan, Liebowitz & Latman, P.C.

(57) ABSTRACT

An electronic device issues a command for setting a function when the function of the electronic device is set by a user by executing software, executes the function in response to the issued command, stores information relating to an invalid function, detects the fact that the issued command is a command for setting the invalid function based on the stored information, and controls so as not to execute the function set by the user in response to the detection that the issued command is a command for setting the invalid function.

20 Claims, 11 Drawing Sheets

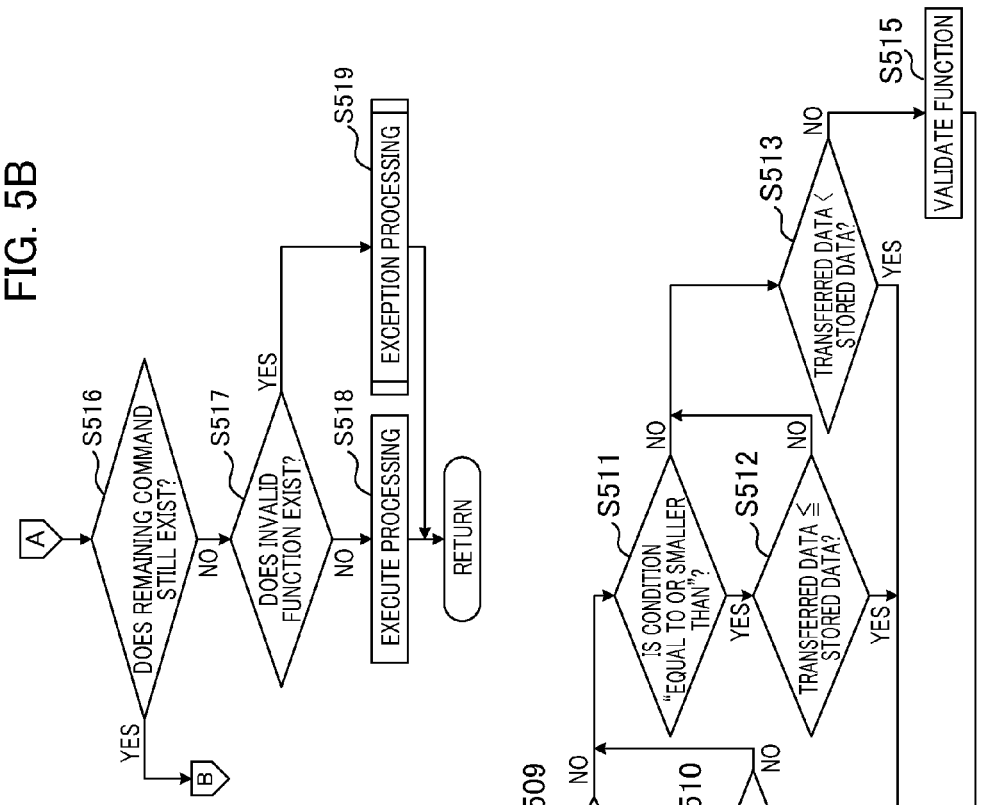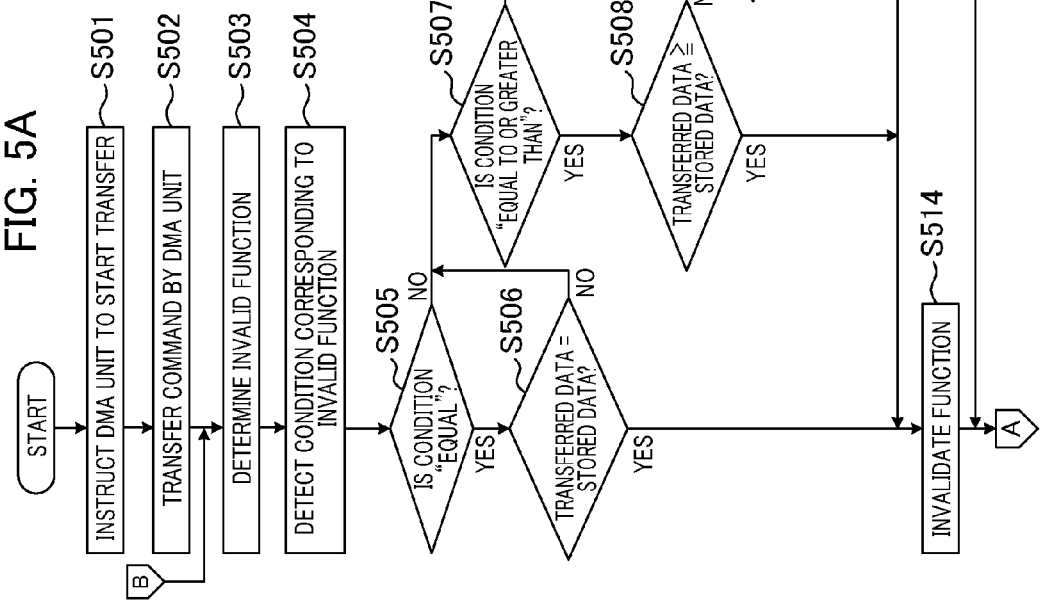

FIG. 11A

| Address | Data | Invalid function |
|---|---|---|
| 0x20000000 | 0x00306000 | ←Shutter speed 1/8000 sec |
| | 0x00304000 | ←Shutter speed 1/4000 sec |
| | 0x00302000 | ←Shutter speed 1/2000 sec |

FIG. 11B

| Address | Data | Group | Condition | Invalid function |
|---|---|---|---|---|
| 0x20000000 | 0x00306000 | | | |
| 0x20000004 | 0x05060007 | 1 | AND | ←Shutter speed 1/8000 sec |
| 0x20000008 | 0x03257007 | | | |
| 0x30000000 | 0x00060075 | 2 | OR | ←ISO sensitivity 3200 |
| 0x30000004 | 0x00340056 | | | |

FIG. 11C

| Address | Data | Condition | Invalid function |
|---|---|---|---|
| 0x20000000 | 0x00306000 | Equal to | ←Shutter speed 1/8000 sec |
| | 0x00304000 | Equal to or greater than | ←Shutter speed 1/4000 sec |
| | 0x00302000 | Equal to or smaller than | ←Shutter speed 1/2000 sec |

FIG. 11D

| Address | Data | Mask | Invalid function |
|---|---|---|---|
| 0x20000000 | 0x00006000 | 0x0000ff00 | ←Shutter speed 1/8000 sec |
| | 0x00000007 | 0x000000ff | ←Shutter speed 1/4000 sec |
| | 0x00302000 | 0x00ff0000 | ←Shutter speed 1/2000 sec |

FIG. 11E

| Address | Data | Invalid bit | Invalid function |
|---|---|---|---|
| 0x20000000 | 0x00306000 | 0 | ←Shutter speed 1/8000 sec |
| | 0x00304000 | 0 | ←Shutter speed 1/4000 sec |
| | 0x00302000 | 1 | ←Shutter speed 1/2000 sec |

FIG. 11F

| Function assignment bit | Invalid function |
|---|---|
| 1 | ←Shutter speed 1/8000 sec |
| 0 | ←Shutter speed 1/4000 sec |
| 0 | ←Shutter speed 1/2000 sec |

ELECTRONIC DEVICE AND IMAGING APPARATUS THAT PREVENT PROCESSING RELATED TO AN INVALID FUNCTION

BACKGROUND OF THE INVENTION

1. Field of the Invention

The present invention relates to an electronic device such as an imaging apparatus, and particularly relates to control of setting values relating to various functions.

2. Description of the Related Art

Conventionally, imaging apparatuses such as digital cameras have controlled a photographing operation and other processing by means of a CPU that operates software. Software used for operating a CPU is also referred to as "firmware" which is normally stored in a non-volatile memory such as a flash ROM or the like. Also, the function of updating the firmware stored in an imaging apparatus with new firmware provided by a manufacturer after a user has purchased the imaging apparatus is commonly used.

Conventionally, imaging apparatuses are configured such that a user can change setting values for functions relating to a photographing operation on a menu screen. At this time, the upper limit setting values for a shutter speed and ISO sensitivity have already been determined so as not to cause any trouble in performing imaging processing. In this manner, imaging apparatuses are protected so as to ensure their operation performance.

However, the firmware installed on an imaging apparatus may undesirably be updated with improper firmware such as firmware other than firmware provided by a valid manufacturer. With the effect of such improper firmware, values which cannot originally be set may be set for the functions for which the setting values are changeable by a user.

In order to protect an apparatus from malfunction due to the settings of values which cannot originally be set and to ensure the operation performance thereof, various processing functions may also be restricted.

For example, in order to reduce the potential of unauthorized use of functions of an apparatus, there has been proposed a method for detecting whether or not a function other than functions enabled in advance is being used by leaving usage information about an apparatus and memory consumption information as log information (e.g., see Japanese Patent Laid-Open No. 2009-37589).

However, usage information about an apparatus and memory consumption information need to be left as log information in the conventional technique. Consequently, immediate action against such an improper usage cannot be taken by detecting an improper usage of functions at all times.

SUMMARY OF THE INVENTION

The present invention provides an electronic device that prevents processing relating to an invalidated function or a restricted function from being executed.

According to an aspect of the present invention, an electronic device is provided that includes a control unit configured to issue a command for setting a function when the function of the electronic device is set by a user by executing software; an execution unit configured to execute the function in response to the command issued by the control unit; a storage unit configured to store information relating to an invalid function; and a detection unit configured to detect the fact that the command issued by the control unit is a command for setting the invalid function based on information stored in the storage unit, wherein the control unit controls the execution unit so as not to execute the function set by the user in response to the detection by the detection unit that the command issued by the control unit is a command for setting the invalid function.

According to the present invention, execution of processing relating to an invalidated function or a restricted function is prevented.

Further features of the present invention will become apparent from the following description of exemplary embodiments with reference to the attached drawings.

BRIEF DESCRIPTION OF THE DRAWINGS

FIGS. 5A and 5B are a flowchart illustrating processing according to a third embodiment of the present invention.

FIGS. 11A to 11F are diagrams illustrating information relating to an invalid function.

DESCRIPTION OF THE PREFERRED EMBODIMENTS

Hereinafter, preferred embodiments of the present invention will be described in detail with reference to the attached drawings. In the following embodiments, a description will be given of the case where the present invention is applied to an imaging apparatus. It should be noted that the technical concept of the present invention is also applicable to other electronic devices.

(First Embodiment)

Figure 1:
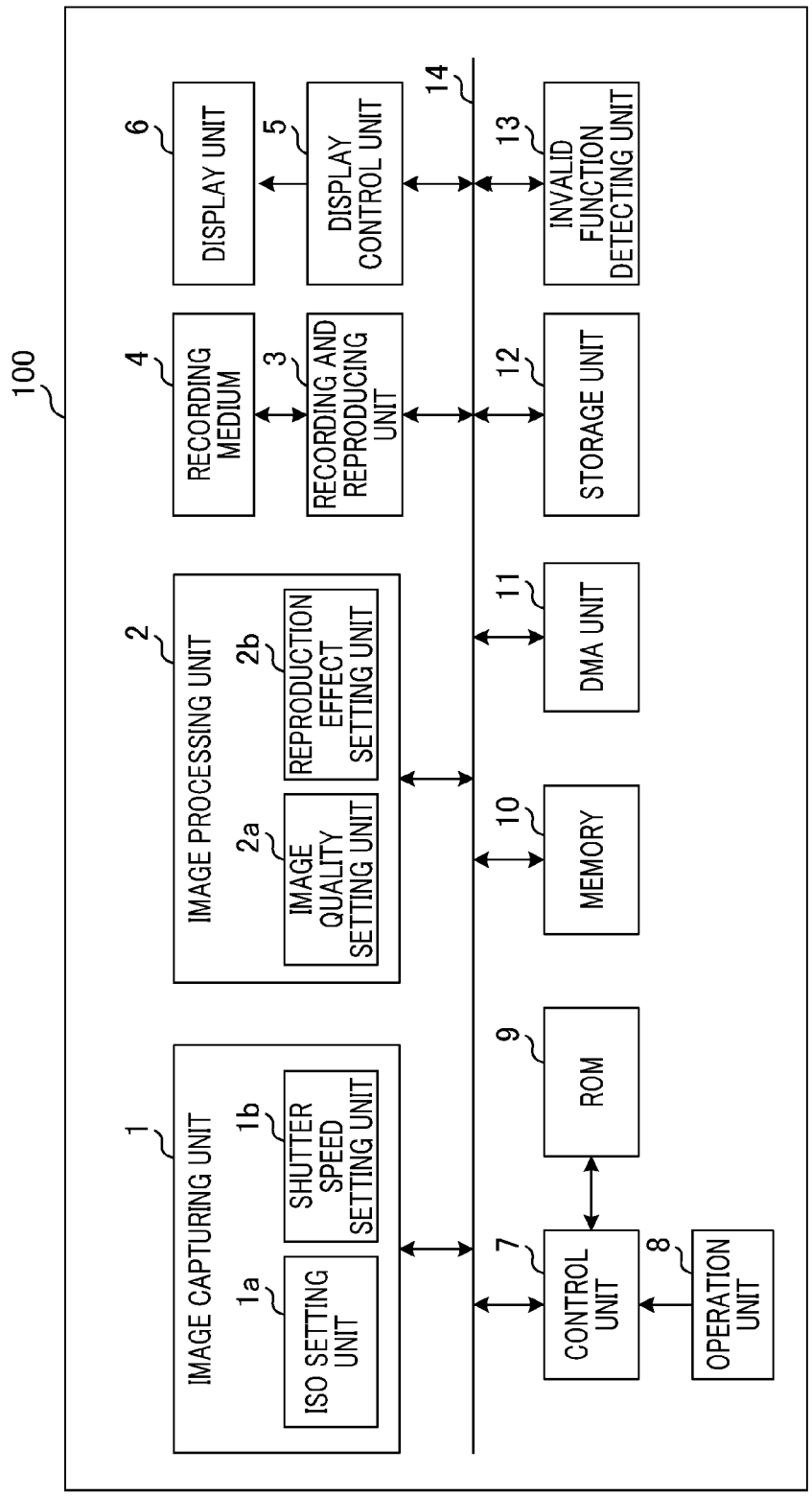
FIG. 1 is a diagram illustrating the configuration of an imaging apparatus according to a first embodiment of the present invention.

FIG. 1 is a block diagram illustrating the configuration of an imaging apparatus according to a first embodiment of the present invention. FIG. 1 is a block diagram illustrating a functional structure of an imaging apparatus 100. In FIG. 1, an image capturing unit 1 includes a lens, a shutter, an aperture, an image capturing element, and the like. The image capturing unit 1 converts light reflected from an object into an electrical signal to thereby output an image signal. In the present embodiment, the image capturing unit 1 generates and outputs a moving image signal in the imaging waiting mode. When an imaging instruction is given by a user, the image capturing unit 1 outputs a still image signal for one screen in response to the imaging instruction. Although the image capturing unit 1 has an ISO setting unit 1a and a shutter speed setting unit 1b as a function block for receiving a command from a control unit 7, the image capturing unit 1 may also have any other function block. An image processing unit 2 performs predetermined image processing for an image signal output from the image capturing unit 1 during imaging.

For example, the image processing unit 2 performs compression processing for a still image signal output from the image capturing unit 1 by using JPEG or the like. The image processing unit 2 also performs expansion processing or reproduction effect processing for a reproduced image signal during reproducing. Although the image processing unit 2 has an image quality setting unit 2a and a reproduction effect setting unit 2b as a function block for receiving a command from the control unit 7, the image processing unit 2 may also have any other function block.

A recording and reproducing unit 3 records a still image signal compressed by the image processing unit 2 in a recording medium 4 during imaging. The recording and reproducing unit 3 reads out a still image signal from the recording medium 4 and outputs the signal to the image processing unit 2 during reproducing. The recording medium 4 is a random accessible recording medium such as a memory card. The recording medium 4 can be readily attached to or detached from the imaging apparatus 100 using an attachment/detachment mechanism (not shown).

A display control unit 5 displays a moving image according to a moving image signal output from the image capturing unit 1 on a display unit 6 in the imaging waiting mode, whereas, when an imaging instruction is given by a user, the display control unit 5 displays a still image according to a still image signal output from the image capturing unit 1 on the display unit 6 in response to the imaging instruction. Also, the display control unit 5 displays a still image reproduced from the recording medium 4 or an index screen including reduced images of a plurality of still image signals recorded in the recording medium 4 on the display unit 6 during reproducing. Furthermore, the display control unit 5 displays various pieces of information such as a menu screen on the display unit 6 in accordance with an instruction given by the control unit 7. Examples of the display unit 6 include a liquid crystal panel, an organic EL device, and the like.

The control unit 7 has a CPU (central processing unit) and other circuits and controls the operation of individual units of the imaging apparatus 100. The control unit 7 controls the imaging apparatus 100 by interpreting and executing software (firmware) stored in a flash ROM 9. The flash ROM 9 is a non-volatile memory that stores firmware. A user may update the firmware stored in the ROM 9. The control unit 7 issues a command consisting of address and data for making the function settings of an imaging apparatus to each function block.

Each function block has a register for storing data included in a command output from the control unit 7. The address of a register in each function block is determined for each function block.

An operation unit 8 includes various operation switches such as a power switch, a shutter button for instructing image capturing, and the like. A part of switches included in the operation unit 8 may also be configured by a touch panel. A user can provide an instruction to the imaging apparatus 100 for imaging by operating the operation unit 8. A user can also change the setting values for various functions relating to imaging and reproduction by operating the operation unit 8. A memory 10 is a volatile memory such as a DRAM or the like and stores an image signal during recording or during reproducing. The memory 10 may also be used for storing various types of data for the control by the control unit 7.

A DMA (Direct Memory Access) unit 11 reads out data stored in a register in each function block, and transfers the read data and the address of the register to an invalid function detecting unit 13. The DMA unit 11 is intended to have a dedicated function that reads out data from each function block and transfers the read data to the invalid function detecting unit 13 when a command transfer instruction is given by the control unit 7.

A storage unit 12 stores command information consisting of address and data which correspond to a predetermined function that is an invalidated function or a restricted function. Hereinafter, command information about an invalid function is referred to as an "invalid value". The storage unit 12 consists of, for example, a ROM (Read Only Memory), a fuse, or the like. The invalid function detecting unit 13 determines whether or not a function by the command is invalid based on the address and data transferred by the DMA unit 11 and the addresses and data stored in the storage unit 12. Then, the determination result and information indicating the invalid function are output to the control unit 7. A bus 14 is used for transmitting/receiving data or a command to/from each individual unit provided in the imaging apparatus 100.

Next, a description will be given of function blocks. The ISO setting unit 1a controls the ISO sensitivity of an image signal captured by the image capturing unit 1. The image capturing unit 1 sets the ISO sensitivity of an image signal to be captured in accordance with the value set by the ISO sensitivity setting unit 1a. For example, when the ISO sensitivity is too large, the noise of a captured still image undesirably increases. Thus, restriction may be enforced to the ISO sensitivity settable by a user.

The shutter speed setting unit 1b controls a shutter speed for capturing an image by the image capturing unit 1. The image capturing unit 1 sets a shutter speed in accordance with the setting value set by the shutter speed setting unit 1b. When the shutter speed is too fast, restriction may be enforced to the shutter speed settable by a user so as to avoid a situation that the operation of the imaging apparatus 100 cannot be ensured such as an abnormal operation of a shutter component provided in the image capturing unit 1.

The image quality setting unit 2a controls the image quality of a still image signal to be recorded. The image processing unit 2 sets the compression ratio for compressing a still image signal to be recorded in accordance with the setting value set by the image quality setting unit 2a. Here, the ratio between the amount of data prior to compression of a still image signal captured by the image capturing unit 1 and the amount of data after compression is defined as a "compression ratio". For example, when the amount of data after compression is 1/5 of the amount of data prior to compression, the compression ratio is defined as 1/5. When the compression ratio is low, the amount of still image data after compression undesirably increases so that the amount of data may not be recorded in the recording medium 4 during continuous shooting. Thus, restriction may be enforced to the compression ratio (image quality) settable by a user.

The reproduction effect setting unit 2b controls the reproduction effect to be subject to a reproduced image. The image processing unit 2 performs special effect processing to a reproduced image in response to the setting value set by the reproduction effect setting unit 2b. When different special effects from those which can be processed by the image processing unit 2 are set by improper firmware, the special effects may not be executed even when such special effects have been set by a user.

Next, a description will be given of firmware update. The imaging apparatus 100 has a function that updates the firmware stored in the ROM 9. When firmware is updated, a user attaches the recording medium 4 in which updated firmware is recorded to the imaging apparatus 100. Then, a user provides an instruction to update firmware by operating the operation unit 8.

When a firmware updating instruction is made by a user, the control unit 7 controls the recording and reproducing unit 3 and reads out data of firmware from the recording medium 4 to thereby store the data in the memory 10. Then, firmware prior to update stored in the ROM 9 is rewritten to firmware for updating stored in the memory 10. Note that a program for controlling execution of update processing is also stored in the storage medium 4 and the control unit 7 updates the firmware stored in the ROM 9 in accordance with the execution program.

When a user turns the power ON by operating the operation unit 8 after the firmware stored in the ROM 9 has been updated, processing performed by the updated firmware becomes effective.

When a user changes the settings of various functions relating to imaging and reproduction, the user operates the operation unit 8 to cause the display unit 6 to display a menu screen. Then, the user sets a desired function by using the menu screen. When the function is set by a user, the control unit 7 outputs a command including an address and data corresponding to the set function to the corresponding function block. Each function block stores data of setting values based on the address included in the command received from the control unit 7.

For example, when a user sets the value of 3200 as ISO sensitivity, the control unit 7 outputs the address corresponding to the ISO sensitivity setting function and data indicating the value of 3200 to the ISO setting unit 1a. Also, when a user sets a shutter speed to a 1/100 sec, the control unit 7 outputs a command including an address corresponding to the shutter speed setting function and data indicating the setting value of 1/100 to the shutter speed setting unit 1b. When a user sets high quality as the image quality of a still image signal, the control unit 7 outputs a command including an address corresponding to the image quality setting function and data indicating a setting value corresponding to high quality to the image quality setting unit 2a. When a user sets a monochrome effect as a reproduction effect, the control unit 7 outputs a command including an address corresponding to the reproduction effect setting function and data indicating a setting value corresponding to the monochrome effect to the reproduction effect setting unit 2b.

For example, as a result of updating the firmware stored in the ROM 9 as described above, it is contemplated that the updated firmware is improper, and thus, a function which is originally invalid may undesirably be settable.

For example, in spite of the fact that a function of setting a shutter speed to a 1/3200 sec is prohibited, it is contemplated that a shutter speed may be altered due to the updated firmware so that a 1/3200 sec can be set.

Accordingly, in the present embodiment, command information consisting of an address and data corresponding to an invalid function is stored in the storage unit 12 as an invalid value and the processing performed by the imaging apparatus 100 is controlled on the basis of the command information stored in the storage unit 12.

Figure 2:
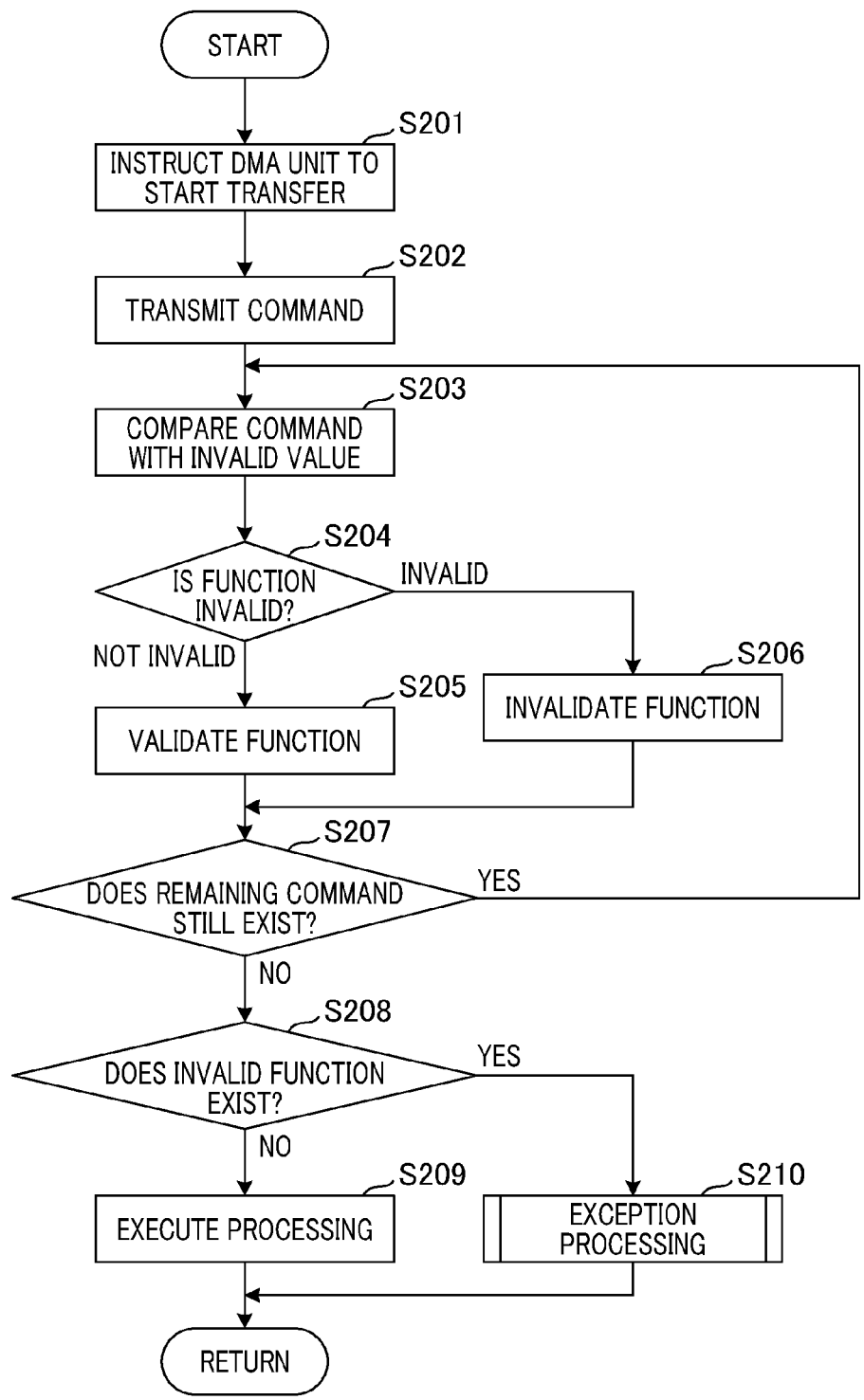
FIG. 2 is a flowchart illustrating processing according to the first embodiment of the present invention.
Figure 3:
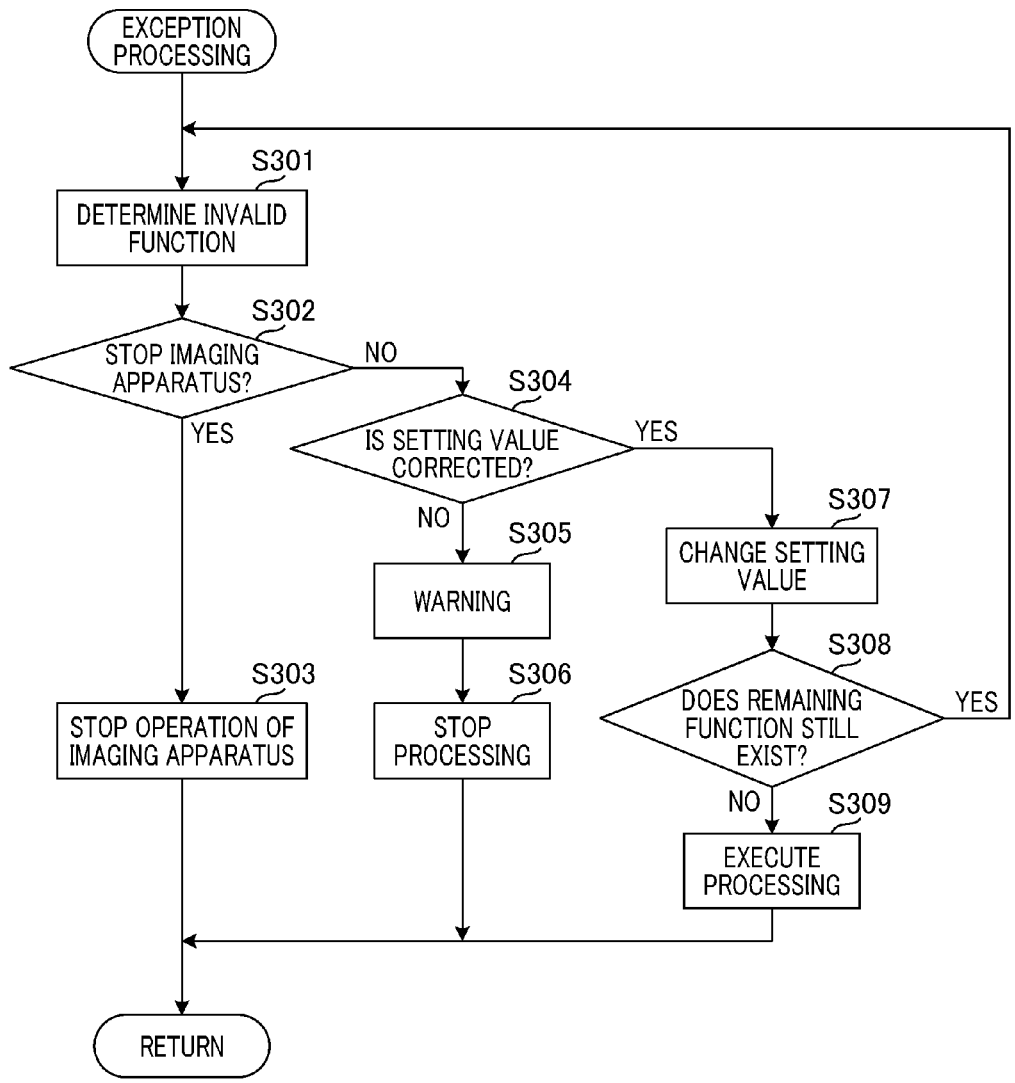
FIG. 3 is a flowchart illustrating exception processing.

FIGS. 2 and 3 are flowcharts illustrating processing performed during imaging or reproducing. In the processing shown in FIGS. 2 and 3, command information (invalid value) relating to an invalidated function or a restricted function is detected so that exception processing is performed. The processing shown in FIGS. 2 and 3 is performed by executing the firmware stored in the ROM 9 by the CPU provided in the control unit 7. A part of the processing shown in FIGS. 2 and 3 is executed by blocks other than the control unit 7. Note that exception processing is processing that protects an imaging apparatus or ensures the operation thereof by preventing the usage of the function set by the improper function settings due to improper firmware. Exception processing includes, for example, the invalidation or the restriction of the following operations or functions:

To restrict an invalidated function or restrict a prescribed function.
To stop or restrict the operation of an imaging apparatus.
To change the content of processing by correcting setting values relating to an invalidated function or a restricted function.
To prevent undesirable modification through warning processing.

FIG. 11A shows invalid values including an address and data corresponding to an invalid function, where the invalid values are stored in the storage unit 12. The first column in FIG. 11A is an address corresponding to an invalid function and the second column is data corresponding to the address. As an example, an address and data corresponding to the shutter speed setting function for use in imaging processing performed by the image capturing unit 1 are shown in FIG. 11A. In addition, the address and data for the invalid function from among other imaging functions and the address and data for the invalid function from among reproducing processing functions are stored in the storage unit 12.

For example, as shown in FIG. 11A, the address 0x20000000 is stored in the storage unit 12 as the address of a command for setting a shutter speed. The data 0x00306000 is stored in the storage unit 12 as data indicating a preset shutter speed of a 1/8000 sec, where the data corresponds to the address 0x20000000. Note that these numeral values are merely examples and may be set to other values. The data 0x00304000 and 0x00302000 are also stored in the storage unit 12 as data indicating preset shutter speeds of a 1/4000 sec and a 1/2000 sec, respectively.

As described above, when the setting values for each function on a menu screen is set by a user, the control unit 7 transmits an address and data to the corresponding function block. When an imaging instruction or a reproducing instruction is output from the operation unit 8 in this state, the processing shown in FIG. 2 starts.

In FIG. 2, the control unit 7 instructs the DMA unit 11 to start transfer of command data from each function block (step S201). The DMA unit 11 reads out data from a function block corresponding to an invalid function from among a plurality of function blocks. The DMA unit 11 generates an address corresponding to the function and transfers the generated address together with the read data to the invalid function detecting unit 13 (step S202). At this time, when the flow shown in FIG. 2 is started by an imaging instruction, the DMA unit 11 reads out data from a function block relating to imaging processing from among a plurality of function blocks and transfers the read data together with its address to the invalid function detecting unit 13. Thus, a command to be transferred by the DMA unit 11 includes an address and data. When there is a plurality of invalid functions, the DMA unit 11 reads out data from a plurality of function blocks corresponding to the plurality of functions and transfers the read data together with addresses corresponding to the functions to the invalid function detecting unit 13.

The invalid function detecting unit 13 compares the address and data transferred by the DMA unit 11 with the addresses and data stored in the storage unit 12 (step S203). As a result of comparison, the invalid function detecting unit 13 determines whether or not a function corresponding to the command issued by the control unit 7 is an invalid function (step S204). In the present embodiment, when the address and data transferred by the DMA unit 11 match the invalid values stored in the storage unit 12, the invalid function detecting unit 13 determines that the function is invalid. When the address and data transferred by the DMA unit 11 do not match the invalid values stored in the storage unit 12, the invalid function detecting unit 13 determines that the function is valid.

When the set function is not invalid, the invalid function detecting unit 13 validates the function (step S205). On the other hand, when the set function is invalid, the invalid function detecting unit 13 invalidates the function (step S206).

Next, the invalid function detecting unit 13 determines whether or not a remaining command transferred by the DMA unit 11 still exists (step S207). When a remaining command still exists, the process returns to step S203 and the process is repeated.

When determination whether or not all the commands transferred by the DMA unit 11 are valid or invalid is completed, the invalid function detecting unit 13 determines whether or not an invalid function exists and outputs information indicating the determination result to the control unit 7 (step S208). When an invalid function exists, the invalid function detecting unit 13 also sends information indicating the function to the control unit 7.

Upon reception of information indicating that no invalid function exists from the invalid function detecting unit 13, the control unit 7 subsequently executes processing in accordance with firmware (step S209). For example, when image capturing is instructed by a user, the control unit 7 executes imaging processing. Upon reception of information indicating that an invalid function exists from the invalid function detecting unit 13, the control unit 7 executes exception processing (step S210).

FIG. 3 is a flowchart illustrating exception processing in step S210 shown in FIG. 2. Firstly, the control unit 7 determines the invalid function based on the information transmitted from the invalid function detecting unit 13 (step S301). Then, the control unit 7 determines whether or not exception processing corresponding to the function that stops the operation of the imaging apparatus 100 so that the imaging apparatus 100 is disabled (step S302). In the present embodiment, exception processing corresponding to each function is determined in advance, information indicating exception processing corresponding to each function is stored in the storage unit 12. When exception processing is processing for disabling the imaging apparatus 100, the control unit 7 turns the power of the imaging apparatus 100 OFF to thereby stop the operation of the imaging apparatus 100 (step S303). Then, a user becomes unable to use the imaging apparatus 100.

On the other hand, when exception processing is not processing for disabling the imaging apparatus 100, the control unit 7 determines whether or not exception processing is processing for correcting the setting value relating to the function by the control unit 7 (step S304). When exception processing is not processing for correcting the setting value relating to the function by the control unit 7, the control unit 7 executes warning processing for notifying a user of the fact that the processing has been stopped because of the settings of the invalid setting values (step S305). In the present embodiment, for example, a warning message or the like is displayed on the display unit 6. In addition, voice is output from a speaker (not shown). Thus, the control unit 7 stops processing after execution of warning processing (step S306). For example, when image capturing is instructed by a user, a photographing operation is prohibited by the process in step S306. Since a user can see an invalid function by confirming a warning message in step S305, the user can perform image capturing when the setting value for the function is changed to a valid value.

In step S304, when exception processing is processing for correcting the setting value relating to the function by the control unit 7, the control unit 7 changes the setting value set by a user to a predetermined value (step S307). Here, the control unit 7 sets, for example, a predetermined value which is not invalid. The predetermined value is determined in advance depending on each function. For example, when a value faster than the upper limit value is set as a setting value in the shutter speed setting function, the control unit 7 sets the upper limit value. Next, the control unit 7 determines whether or not a remaining function in which an invalid value is set still exists (step S308). When a remaining function still exists, the process returns to step S301 and the process is repeated. On the other hand, when no remaining function exists, the control unit 7 executes processing in accordance with firmware (step S309).

For example, a description will be given of the case where a shutter speed is set to a 1/8000 sec by improper firmware despite the fact that a function for setting a shutter speed to a 1/8000 sec is invalid with reference to FIG. 11A.

When a user sets a shutter speed to a 1/8000 sec, the control unit 7 transmits a command including the address 0x20000000 and its data 0x00306000 for setting a shutter speed to the shutter speed setting unit 1b. Then, when an imaging instruction is given by a user, the DMA unit 11 reads out data from the shutter speed setting unit 1b and transfers the read data together with an address corresponding to the shutter speed setting function to the invalid function detecting unit 13. The transferred address 0x20000000 and data 0x00306000 are compared with the addresses and data stored in the storage unit 12.

Since the transferred address matches the value shown in FIG. 11A, the invalid function detecting unit 13 notifies the control unit 7 of information indicating that a function corresponding to the command is invalid and a shutter speed setting is also invalid. Consequently, the control unit 7 executes exception processing for stopping the photographing operation.

Thus, according to the first embodiment, the processing in accordance with the setting value set by improper firmware may be prevented.

(Second Embodiment)

Next, a description will be given of a second embodiment of the present invention. Also in the present embodiment, the configuration of the imaging apparatus 100 and the basic processing are the same as those in the first embodiment. In the present embodiment, when the setting value for a predetermined function is changed, not one command but a plurality of commands is issued from the control unit 7. Also, when the setting value for another predetermined function is changed, any one of a plurality of commands is issued from the control unit 7.

FIG. 11B shows the addresses and data included in commands corresponding to an invalidated function or a restricted function, where the address and data are stored in the storage unit 12. As an example, the addresses and data included in the commands for the shutter speed setting function and the ISO sensitivity setting function for use in imaging processing performed by the image capturing unit 1 are shown in FIG. 11B. As in FIG. 11A, the first column in FIG. 11B is an address and the second column is data. The third and fourth columns in FIG. 11B are additional information which indicates combined information of addresses and data included in the commands for setting invalidated functions or restricted functions.

For example, three commands including three addresses shown in the group 1 in FIG. 11B are issued for setting a shutter speed. When a user sets a shutter speed, a value corresponding to the shutter speed set by the user is added as data to each of three addresses and the resulting data is transmitted as a command. The third column in FIG. 11B is group information indicating a group of commands for setting one function. The fourth column in FIG. 11B is information (condition bit) indicating a function setting condition based on a command for each group. For example, when a shutter speed is changed, all the commands including three addresses and data need to be issued, and thus, the setting condition is set to "AND". Hence, the addresses 0x20000000, 0x20000004, and 0x20000006 for a command corresponding to the shutter speed setting function for setting a shutter speed to a 1/8000 sec and their corresponding data 0x00306000, 0x05060007, and 0x03257007 are stored in the storage unit 12. Furthermore, the AND condition is set as the setting condition.

On the other hand, a command including any one of a plurality of addresses and data included in a group is issued for setting the ISO sensitivity setting function. When ISO sensitivity is changed, either one of data of addresses included in two commands needs to be changed, and thus, the setting condition is set to "OR". The addresses 0x30000000 and 0x30000004 for a command corresponding to the ISO sensitivity setting function for setting ISO sensitivity to 3200 and their corresponding data 0x00060075 and 0x00340056 are stored in the storage unit 12. Furthermore, the OR condition is set as the setting condition.

Figure 4:
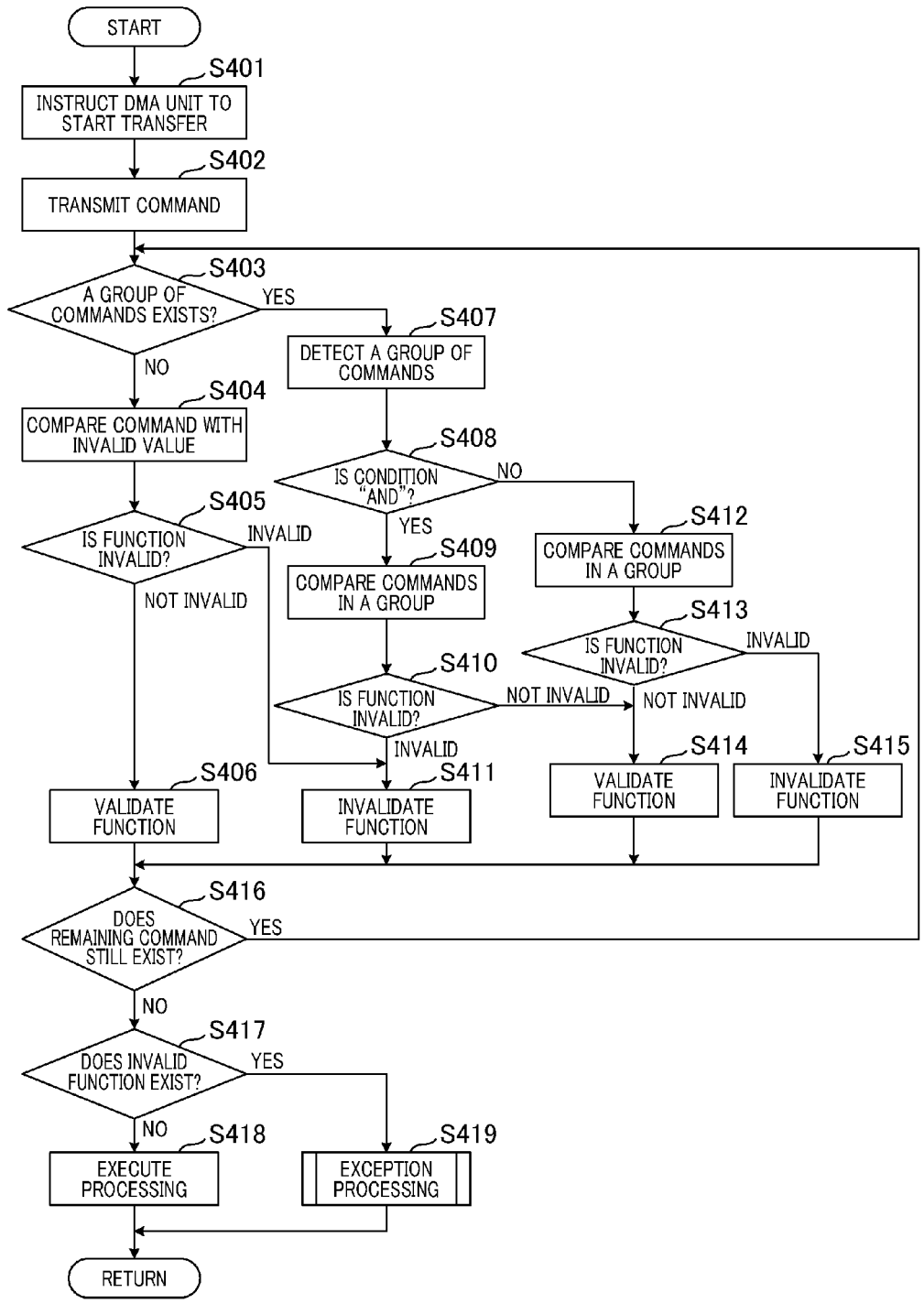
FIG. 4 is a flowchart illustrating processing according to a second embodiment of the present invention.

FIG. 4 is a flowchart illustrating imaging/reproducing processing according to a second embodiment. As in FIG. 2, in the processing shown in FIG. 4, an invalid value relating to an invalidated function or a restricted function is detected so that exception processing is performed. The processing shown in FIG. 4 is performed by executing the firmware stored in the ROM 9 by the CPU provided in the control unit 7. A part of the processing shown in FIG. 4 is executed by blocks other than the control unit 7.

As described above, when a function is set on a menu screen, the control unit 7 transmits a command including an address and data to the corresponding function block. When an imaging instruction or a reproducing instruction is output from the operation unit 8 in this state, the processing shown in FIG. 4 starts.

In FIG. 4, the control unit 7 instructs the DMA unit 11 to start transfer of command data from each function block (step S401). The DMA unit 11 reads out data from a function block corresponding to an invalid function and transfers the read data together with an address corresponding to the function to the invalid function detecting unit 13 (step S402). Data to be transferred by the DMA unit 11 includes a plurality of addresses and data for one function. When there is a plurality of invalid functions, the DMA unit 11 reads out data from a plurality of function blocks corresponding to the plurality of functions and transfers the read data together with the corresponding addresses to the invalid function detecting unit 13.

The invalid function detecting unit 13 determines whether or not a group is set to the transferred command (step S403). For example, when no group is set to the transferred command and the transferred command is a command for setting a function using one address and data, the invalid function detecting unit 13 compares the address and data transferred by the DMA unit 11 with the addresses and data stored in the storage unit 12 (step S404). As a result of comparison, the invalid function detecting unit 13 determines whether or not the function set by a user is invalid (step S405).

When the function is not invalid, the invalid function detecting unit 13 validates the function (step S406). On the other hand, when the function is invalid, the invalid function detecting unit 13 invalidates the function (step S411).

When a group of commands is set in step S406, the invalid function detecting unit 13 detects the addresses of a group including the commands (step S407) and then determines a condition corresponding to the group (step S408). When the condition is set to "AND", the invalid function detecting unit 13 compares a plurality of addresses and data, which have been transferred by the DMA unit 11, in the group with the addresses and data stored in the storage unit 12 (step S409). As a result of comparison, the invalid function detecting unit 13 determines whether or not the function is valid (step S410). When all the addresses and data match the addresses and data stored in the storage unit 12, the invalid function detecting unit 13 determines that the function is invalid (step S411), whereas when any one of the addresses and data does not match the addresses and data stored in the storage unit 12, the invalid function detecting unit 13 determines that the function set by a user is valid (step S414).

In step S408, when the condition is set to "OR", the invalid function detecting unit 13 compares a plurality of addresses and data, which have been transferred by the DMA unit 11, in the group with the addresses and data stored in the storage unit 12 (step S412). As a result of comparison, the invalid function detecting unit 13 determines whether or not the function is valid (step S413). When any one of the addresses and data matches the addresses and data stored in the storage unit 12, the invalid function detecting unit 13 determines that the function is invalid (step S415), whereas no address and no data match the addresses and data stored in the storage unit 12, the invalid function detecting unit 13 determines that the function set by a user is valid (step S414).

Next, the invalid function detecting unit 13 determines whether or not remaining command data transferred by the DMA unit 11 still exists (step S416). When remaining command data still exists, the process returns to step S403 and the process is repeated.

When determination whether or not all the command data transferred by the DMA unit 11 are valid or invalid is completed, the invalid function detecting unit 13 determines whether or not an invalid function exists and outputs information indicating the determination result to the control unit 7 (step S417). When an invalid function exists, the invalid function detecting unit 13 also sends information indicating the function to the control unit 7.

Upon reception of information indicating that no invalid function exists from the invalid function detecting unit 13, the control unit 7 subsequently executes processing in accordance with firmware (step S418). Upon reception of information indicating that an invalid function exists from the invalid function detecting unit 13, the control unit 7 executes exception processing shown in FIG. 3 (step S419).

For example, a description will be given of the case where a shutter speed is set to a 1/8000 sec by improper firmware despite the fact that a function for setting a shutter speed to a 1/8000 sec is invalid with reference to FIG. 11B.

When a user sets a shutter speed to a 1/8000 sec, the control unit 7 sets the address 0x20000000 and data 0x00306000 for setting a shutter speed to the shutter speed setting unit 1b. Also, the control unit 7 sets data 0x05060007 to the address 0x20000004 and data 0x03257007 to the address 0x20000008. Then, the control unit 7 sends a command including these addresses and data.

When an imaging instruction is given by a user, the DMA unit 11 transfers the addresses and data included in the commands issued to the shutter speed setting unit 107 to the invalid function detecting unit 13. The transferred addresses and data are compared with the addresses and data shown in FIG. 11B stored in the storage unit 12. The commands relating to the shutter speed setting function are determined as the group 1 and the setting condition for the group 1 is determined as "AND". Thus, the invalid function detecting unit 13 determines whether or not all the addresses and data match the addresses and data stored in the storage unit 12. Since the transferred addresses match the values shown in FIG. 11B, the invalid function detecting unit 13 notifies the control unit 7 of information indicating that there is an invalid function and a shutter speed setting is also invalid. Consequently, the control unit 7 executes exception processing for stopping the photographing operation.

A description will be given of the case where ISO sensitivity is set to 3200 by improper firmware despite the fact that a function for setting ISO sensitivity to 3200 is invalid with reference to FIG. 11B.

When a user sets ISO sensitivity to 3200, the control unit 7 sets data 0x00060075 to the address 0x30000000 for setting ISO sensitivity. Then, the control unit 7 transmits a command including these addresses and data to the ISO setting unit 1*a*.

When an imaging instruction is given by a user, the DMA unit 11 transfers the addresses and data included in the commands issued to the ISO setting unit 1*a* to the invalid function detecting unit 13. The transferred addresses and data are compared with the addresses and data shown in FIG. 11B stored in the storage unit 12. The commands relating to the ISO sensitivity setting function are determined as group 2 and the setting condition for the group 2 is determined as "OR". Thus, the invalid function detecting unit 13 determines whether or not the transferred address and data match any one of the addresses and data stored in the storage unit 12. Since the transferred addresses match the values shown in FIG. 11B, the invalid function detecting unit 13 notifies the control unit 7 of information indicating that there is an invalid function and the ISO sensitivity setting is also invalid. Consequently, the control unit 7 executes exception processing for stopping the photographing operation.

Thus, according to the second embodiment, execution of the processing in accordance with the setting value set by improper firmware may be prevented. When a plurality of commands is issued for setting an invalid value for the invalid function, execution of the processing in accordance with the invalid value may be prevented.

(Third Embodiment)

Next, a description will be given of a third embodiment of the present invention. Also in the present embodiment, the configuration of the imaging apparatus 100 and the basic processing are the same as those in the first embodiment.

FIG. 11C shows the address and data included in a command corresponding to an invalidated function or a restricted function, where the address and data are stored in the storage unit 12. As an example, the address and data included in a command for the shutter speed setting function for use in imaging processing performed by the image capturing unit 1 are shown in FIG. 11C. As in FIG. 11A, the first column in FIG. 11C is an address and the second column is data. These are the same as those shown in FIG. 11A. The third column in FIG. 11C indicates the condition for determining whether or not the function set by a user is invalid. In the present embodiment, any one of the following five conditions relating to a magnitude relation between the setting value X set by a user and the data Y stored in the storage unit 12 is set.

1. X=Y (X is equal to Y)
2. X>Y (X is greater than Y)
3. X≧Y (X is equal to or greater than Y)
4. X<Y (X is smaller than Y)
5. X≦Y (X is equal to or smaller than Y)

For example, in FIG. 11C, the address 0x20000000 for setting a shutter speed and data 0x00306000 corresponding thereto are stored. The condition that X is equal to Y is set as a condition. Also, the address 0x20000000 for setting a shutter speed and data 0x00304000 corresponding thereto are stored. The condition that X is equal to or greater than Y is set as a condition. Further, the address 0x20000000 for setting a shutter speed and data 0x00302000 corresponding thereto are stored. The condition that X is equal to or smaller than Y is set as a condition.

FIGS. 5A and 5B are a flowchart illustrating imaging/reproducing processing according to the third embodiment. As in FIG. 2, in the processing shown in FIG. 5, a setting value relating to an invalidated function or a restricted function is detected so that exception processing is performed. The processing shown in FIGS. 5A and 5B is performed by executing the firmware stored in the ROM 9 by the CPU provided in the control unit 7.

As described above, when a function is set on a menu screen, the control unit 7 transmits the address and data to the corresponding function block. When an imaging instruction or a reproducing instruction is output from the operation unit 8 in this state, the processing shown in FIG. 5 starts.

In FIG. 5A, the control unit 7 instructs the DMA unit 11 to start transfer of command from each function block (step S501). The DMA unit 11 reads out data from a function block corresponding to an invalid function from among a plurality of function blocks. The DMA unit 11 transfers the read data together with an address corresponding thereto to the invalid function detecting unit 13 (step S502). When there is a plurality of invalid functions, the DMA unit 11 reads out data from a plurality of function blocks corresponding to the plurality of functions and transfers the read data together with addresses corresponding to the functions to the invalid function detecting unit 13.

The invalid function detecting unit 13 determines the corresponding function based on the transferred address and data (step S503). Then, the invalid function detecting unit 13 detects a condition corresponding to the determined function based on the information stored in the storage unit 12 (step S504). The invalid function detecting unit 13 determines whether or not the condition that X is equal to Y is set (step S505). When the condition is set as "equal to", the invalid function detecting unit 13 determines whether or not the data Y corresponding to the condition is equal to the data X included in the transferred command (step S506). When X is equal to Y, the invalid function detecting unit 13 invalidates the setting value (step S514).

When the condition "equal to" is not set in step S505 and when the data X transferred in step S506 is not equal to the stored data Y, the invalid function detecting unit 13 determines whether or not the condition that X is equal to or greater than Y is set (step S507). When the condition that X is equal to or greater than Y is set, the invalid function detecting unit 13 determines whether or not X is equal to or greater than Y (step S508). When the transferred data X is equal to or greater than the stored data Y, the invalid function detecting unit 13 invalidates the function (step S514).

When the condition "equal to or greater than" is not set in step S507 and when X is not equal to or greater than Y in step S508, the invalid function detecting unit 13 determines whether or not the condition that X is greater than Y is set (step S509). When the condition that X is greater than Y is set, the invalid function detecting unit 13 determines whether or not the transferred data X is greater than the stored data Y (step S510). When X is greater than Y, the invalid function detecting unit 13 invalidates the function (step S514).

When the condition "greater than" is not set in step S509 and when X is not greater than Y in step S510, the invalid function detecting unit 13 determines whether or not the condition that X is equal to or smaller than Y is set (step S511). When the condition that X is equal to or smaller than Y is set, the invalid function detecting unit 13 determines whether or not the transferred data X is equal to or smaller than the stored data Y (step S512). When X is equal to or smaller than Y, the invalid function detecting unit 13 invalidates the function (step S514).

When the condition "equal to or smaller than" is not set in step S511 and when X is not equal to or smaller than Y in step S512, the invalid function detecting unit 13 determines whether or not the transferred data X is smaller than the stored data Y (step S513). When X is smaller than Y, the invalid function detecting unit 13 invalidates the function (step S514).

When X is not smaller than Y in step S513, the invalid function detecting unit 13 validates the function (step S515).

Next, the invalid function detecting unit 13 determines whether or not a remaining command transferred by the DMA unit 11 still exists (step S516 in FIG. 5B). When a remaining command still exists, the process returns to step S503 and the process is repeated.

When determination whether or not all the commands transferred by the DMA unit 11 are valid or invalid is completed, the invalid function detecting unit 13 determines whether or not an invalid function exists and outputs information indicating the determination result to the control unit 7 (step S517). When an invalid function exists, the invalid function detecting unit 13 also sends information indicating the function to the control unit 7.

Upon reception of information indicating that no invalid function exists from the invalid function detecting unit 13, the control unit 7 subsequently executes processing in accordance with firmware (step S518). Upon reception of information indicating that an invalid function exists from the invalid function detecting unit 13, the control unit 7 executes exception processing shown in FIG. 3 (step S519).

For example, a 1/8000 sec, a 1/4000 sec, and a 1/2000 sec are set in the shutter speed setting function as shown in FIG. 11C. Furthermore, the condition "equal to", the condition "equal to or greater than", or the condition "equal to or smaller than" is set as a condition for each invalid value.

When a user sets a shutter speed to a 1/8000 sec, the control unit 7 sets data 0x00306000 to the address 0x20000000 for setting a shutter speed to the shutter speed setting unit 1b.

When an imaging instruction is given by a user, the DMA unit 11 transfers a command including the address and data set by the shutter speed setting unit 1b to the invalid function detecting unit 13. The transferred address and data are compared with the address and data shown in FIG. 11C stored in the storage unit 12 in accordance with the condition thereof. When a user sets a shutter speed to a 1/8000 sec, the transferred data matches the data 0x00306000 shown in FIG. 11C. Thus, the invalid function detecting unit 13 notifies the control unit 7 of information indicating that there is an invalid function and a shutter speed setting is also invalid. Consequently, the control unit 7 executes exception processing for stopping the photographing operation.

Also, when the DMA unit 11 transfers the address 0x20000000 and data 0x00304001 corresponding thereto to the invalid function detecting unit 13, the data 0x00304001 is equal to or greater than the invalid value 0x00304000 corresponding to the condition "equal to or greater than". Thus, the invalid function detecting unit 13 determines that a function corresponding to the command including the address and data is invalid.

Also, when the DMA unit 11 transfers data 0x00301FFF corresponding to the address 0x20000000 to the invalid function detecting unit 13, the data 0x00301FFF is equal to or smaller than the invalid value 0x00302000 corresponding to the condition "equal to or smaller than". Thus, the invalid function detecting unit 13 determines that a function corresponding to the command including the address and data is invalid.

Thus, according to the third embodiment, execution of the processing in accordance with the setting value set by improper firmware may be prevented. Since whether or not a setting value is invalid is determined based on the condition for determining an invalid setting value, an invalid value can be appropriately determined even when a value other than the invalid values stored in the storage unit 12 is set.

(Fourth Embodiment)

Next, a description will be given of a fourth embodiment of the present invention. Also in the present embodiment, the configuration of the imaging apparatus 100 and the basic processing are the same as those in the first embodiment. In the present embodiment, when the setting value for a predetermined function is changed, the control unit 7 sets a value corresponding to a setting value to a part of digital data including a plurality of bits corresponding to the address.

FIG. 11D shows the address and data included in a command corresponding to an invalidated function or a restricted function, where the address and data are stored in the storage unit 12. As an example, the address and data included in a command corresponding to the shutter speed setting function for use in imaging processing performed by the image capturing unit 1 are shown in FIG. 11D. The first column in FIG. 11D is an address and the second column is data. These are the same as those shown in FIG. 11A. The third column in FIG. 11D is mask data. The mask data is used for masking a portion of a plurality of bits and bits other than the masked portion are comparison object. That is to say, the mask data is information so that the portion of bits other than bits associated with the function is not used.

For example, in FIG. 11D, the address 0x20000000 for the function for setting a shutter speed to a 1/8000 sec, the data 0x00006000 corresponding thereto, and its mask data 0x0000ff00 are registered. Also, the address 0x20000000, the data 0x00000007 corresponding thereto, and its mask data 0x000000ff for the function for setting a shutter speed to a 1/4000 sec are registered. Furthermore, the address 0x20000000 for the function for setting a shutter speed to a 1/2000 sec, the data 0x00302000 corresponding thereto, and its mask data 0x00ff0000 are registered.

Figure 6:
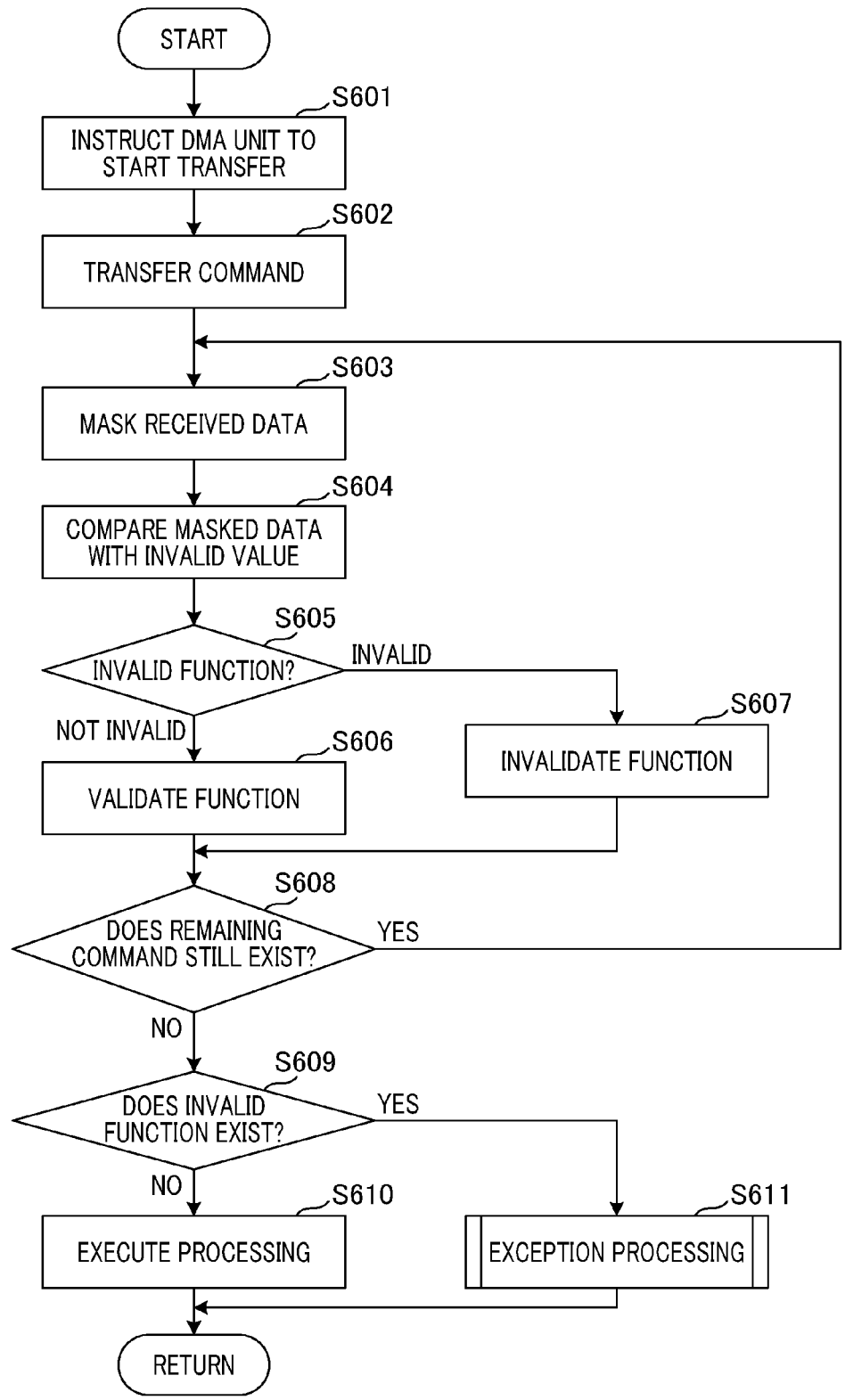
FIG. 6 is a flowchart illustrating processing according to a fourth embodiment of the present invention.

FIG. 6 is a flowchart illustrating imaging/reproducing processing according to the fourth embodiment. As in FIG. 2, in the processing shown in FIG. 6, a setting value relating to an invalidated function or a restricted function is detected so that exception processing is performed. The processing shown in FIG. 6 is performed by executing the firmware stored in the ROM 9 by the CPU provided in the control unit 7.

As described above, when a function is set on a menu screen, the control unit 7 transmits the address and data to the corresponding function block. When an imaging instruction or a reproducing instruction is output from the operation unit 8 in this state, the processing shown in FIG. 6 starts.

In FIG. 6, the control unit 7 instructs the DMA unit 11 to start transfer of command data from each function block (step S601). The DMA unit 11 reads out data from a function block corresponding to a function in which an invalid value is set from among a plurality of function blocks, and transfers the read data together with the corresponding addresses to the invalid function detecting unit 13 (step S602).

The invalid function detecting unit 13 generates mask data, in which a portion of bits of the data transferred by the DMA unit 11 is masked, based on the mask data stored in the storage unit 12 (step S603). More specifically, the invalid function detecting unit 13 detects the same address as the transferred address from the addresses of the invalid functions stored in the storage unit 12. Then, the invalid function detecting unit 13 detects data registered to the same address as the transferred address and its mask data. For example, when the transferred address is 0x20000000, the invalid function detecting unit 13 detects three mask data corresponding to the address from FIG. 11D. Then, the transferred data is masked by these three mask data to thereby generate three mask data.

Next, the invalid function detecting unit 13 respectively compares the generated mask data with data stored in the storage unit 12 (step S604). As a result of comparison, the invalid function detecting unit 13 determines whether or not the function set by a user is invalid (step S605).

When the set function is not invalid, the invalid function detecting unit 13 validates the function (step S606). On the other hand, when the set function is invalid, the invalid function detecting unit 13 invalidates the function (step S607). Next, the invalid function detecting unit 13 determines whether or not a remaining command transferred by the DMA unit 11 still exists (step S608). When a remaining command still exists, the process returns to step S603 and the process is repeated.

When determination whether or not all the commands transferred by the DMA unit 11 are valid or invalid is completed, the invalid function detecting unit 13 determines whether or not a function of which the setting value is invalid exists and outputs information indicating the determination result to the control unit 7 (step S609). When a function of which the setting value is invalid exists, the invalid function detecting unit 13 also sends information indicating the function to the control unit 7.

Upon reception of information indicating that no invalid function exists from the invalid function detecting unit 13, the control unit 7 subsequently executes processing in accordance with firmware (step S610). For example, when image capturing is instructed by a user, the control unit 7 executes imaging processing. Also, upon reception of information indicating that an invalid function exists from the invalid function detecting unit 13, the control unit 7 executes exception processing shown in FIG. 3 (step S611).

For example, when a user sets a shutter speed to a 1/8000 sec, the control unit 7 issues a command including the address 0x20000000 and its data 0x00306000 for setting a shutter speed to the shutter speed setting unit 1b.

When an imaging instruction is given by a user, the DMA unit 11 transfers a command including the address and date set to the shutter speed setting unit 1b to the invalid function detecting unit 13. When a user sets a shutter speed to a 1/8000 sec, the transferred address is 0x20000000. The invalid function detecting unit 13 masks the transferred data 0x00306000 based on three mask data corresponding to the address 0x20000000 shown in FIG. 12A to thereby generate three mask data.

More specifically, 0x00306000 is masked with 0x00ff0000 to thereby obtain 0x00300000, 0x00306000 is masked by 0x0000ff00 to thereby obtain 0x00006000, and 0x00306000 is masked by 0x000000ff to thereby obtain 0x00000000.

The invalid function detecting unit 13 compares thus obtained three data with data shown in FIG. 11D so as to determine whether or not they match each other. The mask data 0x00006000 obtained by masking 0x00306000 with 0x0000ff00 matches data 0x00006000 corresponding to the mask data. Thus, the invalid function detecting unit 13 notifies the control unit 7 of information indicating that there is an invalid function and a shutter speed setting is also invalid. Consequently, the control unit 7 executes exception processing for stopping the photographing operation.

Thus, according to the fourth embodiment, execution of the processing in accordance with the setting value set by improper firmware may be prevented. Even when a portion of data including a plurality of bits is used as a setting value, an invalid value can be appropriately determined.

(Fifth Embodiment)

Next, a description will be given of a fifth embodiment of the present invention. Also in the present embodiment, the configuration of the imaging apparatus 100 and the basic processing are the same as those in the first embodiment. In the present embodiment, functions to be invalidated, which are stored in the storage unit 12 upon shipping of the product, are made changeable to be invalidated or not after the shipment of the product.

FIG. 11E shows the address and data included in a command corresponding to an invalidated function or a restricted function, where the address and data are stored in the storage unit 12. As an example, the address and data included in a command for the shutter speed setting function for use in imaging processing performed by the image capturing unit 1 are shown in FIG. 11E. The first column in FIG. 11E is an address and the second column is data. These are the same as those shown in FIG. 11A. The third column in FIG. 11E is an invalid bit which is information indicating whether or not an invalid setting for the corresponding function is valid. When the value of the invalid bit is a first value (here, 1), the invalid setting is invalid, and thus, the function therefor is valid. When the value of the invalid bit is a second value (here, 0), the invalid setting is valid, and thus, the function therefor is invalid.

The invalid bit stored in the storage unit 12 is not changed by firmware update processing as described above. For example, a user can change the invalid bit by bringing the imaging apparatus 100 to the service center authorized by the manufacturer of the same.

Figure 7:
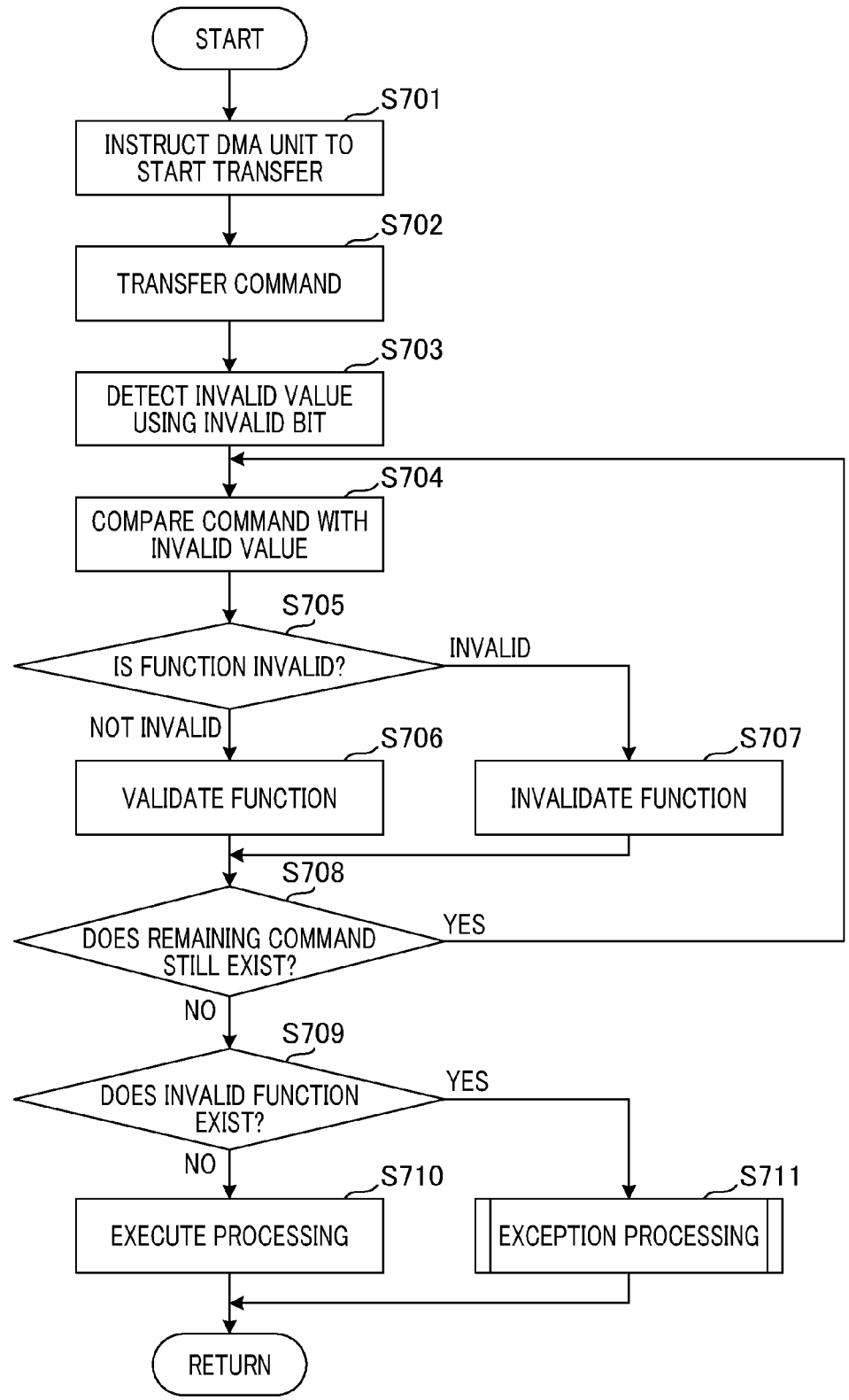
FIG. 7 is a flowchart illustrating processing according to a fifth embodiment of the present invention.

FIG. 7 is a flowchart illustrating imaging/reproducing processing according to the fifth embodiment. As in FIG. 2, in the processing shown in FIG. 7, an invalidated function or a restricted function is detected so that exception processing is performed. The processing shown in FIG. 7 is performed by executing the firmware stored in the ROM 9 by the CPU provided in the control unit 7.

As described above, when a function is set on a menu screen, the control unit 7 transmits the address and data to the corresponding function block. When an imaging instruction or a reproducing instruction is output from the operation unit 8 in this state, the processing shown in FIG. 7 starts.

In FIG. 7, the control unit 7 instructs the DMA unit 11 to start transfer of command from each function block (step S701). The DMA unit 11 reads out data from a function block corresponding to the function in which an invalid value is set, and transfers the read data together with the corresponding addresses to the invalid function detecting unit 13 (step S702).

The invalid function detecting unit 13 detects the address and data included in a command corresponding to the invalid function based on the invalid bit stored in the storage unit 12 (step S703). Next, the invalid function detecting unit 13 compares the detected address and data with the transferred address and data (step S704). As a result of comparison, the invalid function detecting unit 13 determines whether or not the function set by a user is invalid (step S705).

When the function set by a user is not invalid, the invalid function detecting unit 13 validates the function (step S706). On the other hand, when the function set by a user is invalid, the invalid function detecting unit 13 invalidates the function (step S707). Next, the invalid function detecting unit 13 determines whether or not a remaining command transferred by the DMA unit 11 still exists (step S708). When a remaining command still exists, the process returns to step S703 and the process is repeated.

When determination whether or not all the commands transferred by the DMA unit 11 are valid or invalid is completed, the invalid function detecting unit 13 determines whether or not an invalid function exists and outputs information indicating the determination result to the control unit 7 (step S709). When a function of which the setting value is invalid exists, the invalid function detecting unit 13 also sends information indicating the function to the control unit 7.

Upon reception of information indicating that no invalid function exists from the invalid function detecting unit 13, the control unit 7 subsequently executes processing in accordance with firmware (step S710). For example, when image capturing is instructed by a user, the control unit 7 executes imaging processing. Also, upon reception of information indicating that an invalid function exists from the invalid function detecting unit 13, the control unit 7 executes exception processing shown in FIG. 3 (step S711).

For example, when a user sets a shutter speed to a 1/8000 sec, the control unit 7 outputs the address 0x20000000 and data 0x00306000 for setting a shutter speed to the shutter speed setting unit 1b.

When an imaging instruction is given by a user, the DMA unit 11 transfers a command including the address and data set by the shutter speed setting unit 1b to the invalid function detecting unit 13. When a user sets a shutter speed to a 1/8000 sec, the transferred address is 0x20000000. The invalid function detecting unit 13 detects the values of the invalid bits corresponding to three invalid values corresponding to the address 0x20000000 shown in FIG. 11E.

In FIG. 11E, the invalid bit for both data 0x00306000 and 0x00304000 is zero. The invalid function detecting unit 13 compares data of which the invalid bit is zero with data shown in FIG. 12A so as to determine whether or not they match each other. Data 0x00306000 matches data 0x00306000 which is determined as invalid by the invalid bit shown in FIG. 11E. Thus, the invalid function detecting unit 13 notifies the control unit 7 of information indicating that there is an invalid function and a shutter speed setting is also invalid. Consequently, the control unit 7 executes exception processing for stopping the photographing operation.

Thus, according to the fifth embodiment, execution of the processing in accordance with the setting value set by improper firmware may be prevented. Even when an invalid value is changed to a valid value or an invalid value is newly set after the shipment of an imaging apparatus, execution of the processing in accordance with the invalid value may be prevented.

(Sixth Embodiment)

Next, a description will be given of a sixth embodiment of the present invention. In the first to fifth embodiments, the addresses and invalid values included in commands for setting invalid functions as shown in FIGS. 11A to 11E are stored in the storage unit 12 in advance. In the present embodiment, the control unit 7 executes a program (firmware) stored in the ROM 9 at power on so that the control unit 7 writes data for the address and its invalid value for the invalid function to the storage unit 12.

The storage unit 12 stores information (function assignment bit) indicating whether or not a predetermined function is invalid. The address storing function assignment bits is predetermined for each function. In FIG. 11F, exemplary function assignment bits indicating whether or not each of the functions for setting a shutter speed to a 1/8000 sec, a 1/4000 sec, and a 1/2000 sec is invalid are shown.

In addition to the function described in the first embodiment, the control unit 7 writes the address and data for setting an invalid function to the storage unit 12 based on information about a function assignment bit as shown in FIG. 11F stored in the storage unit 12 at power on. The address and data written to the storage unit 12 by the control unit 7 are the same information as those shown in FIG. 11A.

As shown in FIG. 11F, when the value of a function assignment bit is the first value (here, 1), an invalid setting for the corresponding function is valid, that is, the function is invalid. When the value of a function assignment bit is the second value (here, 0), the corresponding function is valid.

For example, since the value of a function assignment bit shown in the first column in FIG. 11F is 1, the function for setting a shutter speed to a 1/8000 sec is invalid. Since the value of a function assignment bit in each of the second and third columns in FIG. 11F is 0, both the function for setting a shutter speed to a 1/4000 sec and the function for setting a shutter speed to a 1/2000 sec are valid.

Also, the address and data of a command corresponding to a predetermined function is registered in advance in the firmware stored in the ROM 9. Furthermore, information about addresses stored in the storage unit 12, which stores function assignment bits corresponding to functions, is also registered in advance in the firmware stored in the ROM 9.

Figure 8:
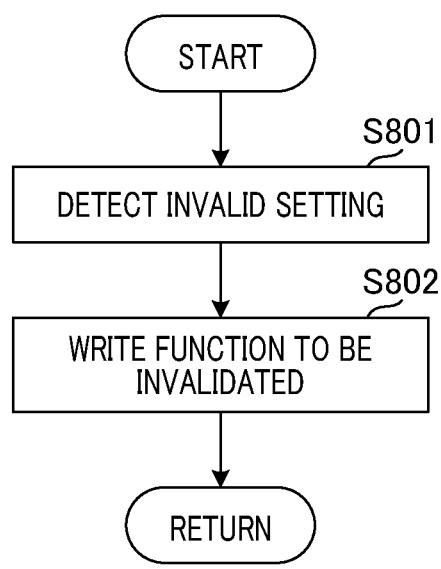
FIG. 8 is a flowchart illustrating processing according to a sixth embodiment of the present invention.

FIG. 8 is a flowchart illustrating processing for writing the address and data for an invalid function, where the processing is executed by the control unit 7 at power on.

When electric power is turned on by the operation unit 8, the control unit 7 executes the firmware stored in the ROM 9 to thereby check a function assignment bit corresponding to each function stored in the storage unit 12 (step S801). Then, the control unit 7 determines whether or not the corresponding function is invalidated based on the value of a function assignment bit. When the control unit 7 determines that the value of a function assignment bit is 1, the control unit 7 writes the address and data corresponding to the invalid function to the storage unit 12 (step S802). Note that the storage unit 12 has a region for storing the address and data for a function determined to be invalid by the control unit 7.

As described above, the control unit 7 writes the addresses and data for setting all the invalid function to the storage unit 12. Then, the same processing as that in the first embodiment is executed.

For example, since the value of a function assignment bit shown in the first column in FIG. 11F is 1, the control unit 7 determines that the function for setting a shutter speed to a 1/8000 sec is invalidated. Thus, the control unit 7 executes firmware to thereby write the address 0x20000000 and data 0x00306000 for setting a shutter speed to 1/8000 to the storage unit 12.

(Seventh Embodiment)

Figure 9:
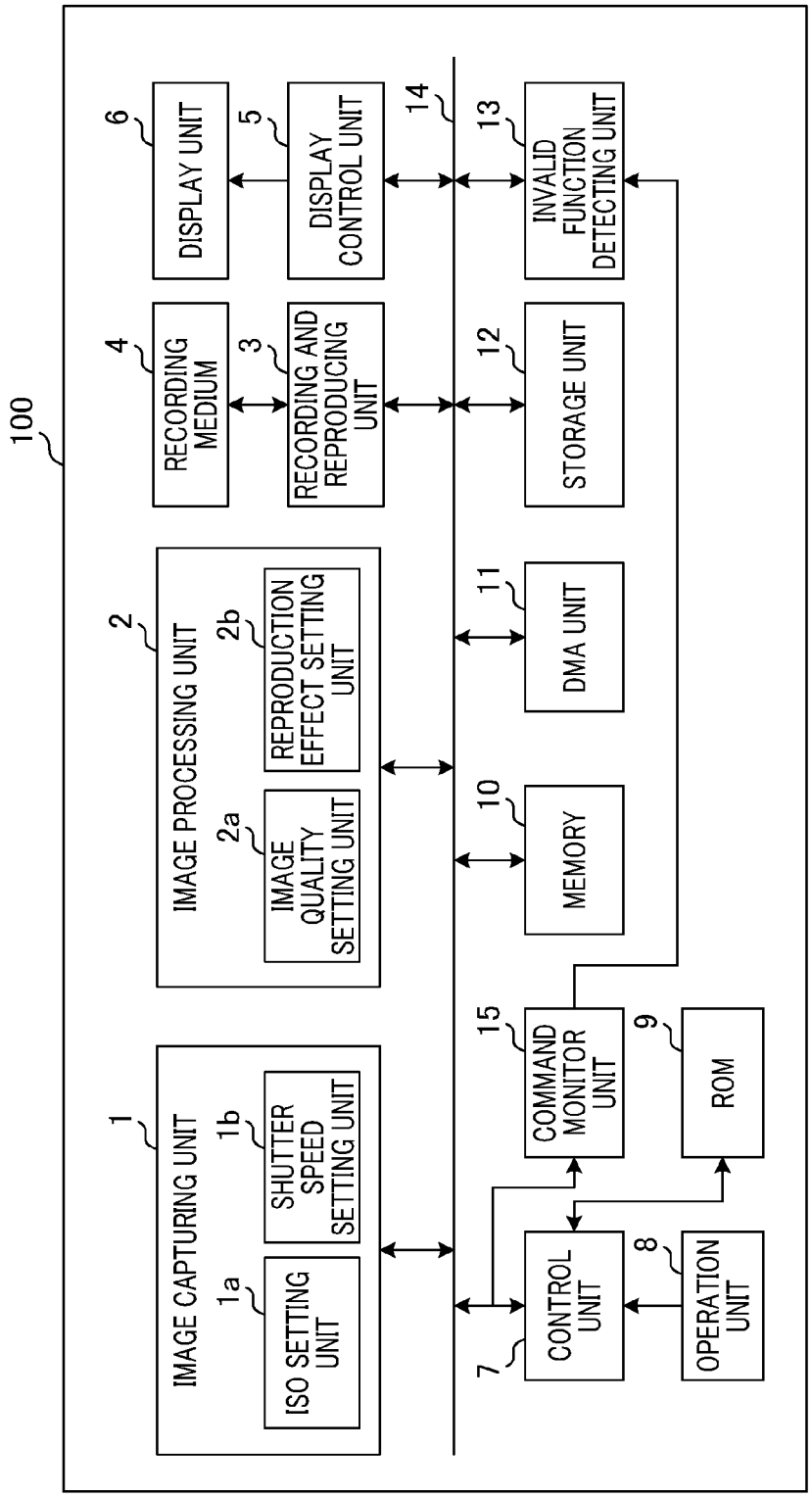
FIG. 9 is a diagram illustrating the configuration of a control unit of an imaging apparatus according to a seventh embodiment of the present invention.

Next, a description will be given of a seventh embodiment of the present invention. FIG. 9 is a block diagram illustrating the configuration of the imaging apparatus 100 according to a seventh embodiment. Components corresponding to or similar to those shown in FIG. 1 are designated by the same reference numerals, and therefore, its detailed explanation will be omitted. In the first to sixth embodiments, when an imaging instruction or a reproducing instruction is provided by a user, the control unit 7 determines whether or not an invalid function is set to thereby execute exception processing.

In the present embodiment, a command monitor unit 15 is provided. The command monitor unit 15 removes the address and data included in a command corresponding to an invalid function from among the addresses and data issued from the control unit 7 and transfers the address and data to the invalid function detecting unit 13.

Figure 10:
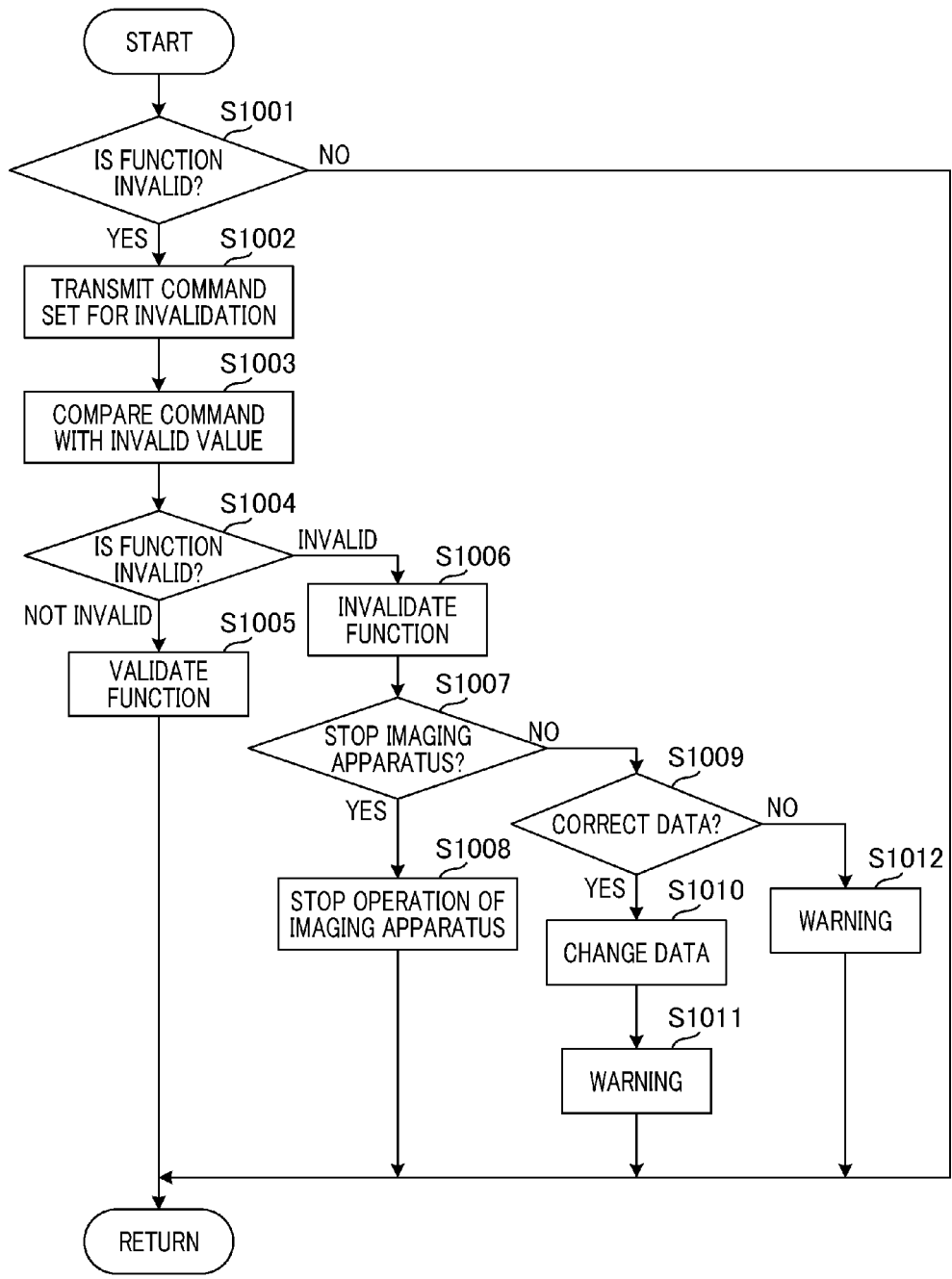
FIG. 10 is a flowchart illustrating processing according to a seventh embodiment of the present invention.

As described above, when a function is set on a menu screen, the control unit 7 transmits the address and data to the corresponding function block. FIG. 10 is a flowchart illustrating processing to be executed when a command is issued from the control unit 7. The processing shown in FIG. 10 is performed by executing the firmware stored in the ROM 9 by the CPU provided in the control unit 7.

In FIG. 10, when a command is issued from the control unit 7, the command monitor unit 15 acquires the issued command. Then, the command monitor unit 15 determines whether or not the acquired command is a command for the invalid function based on command information about the invalid function, where the command information is stored in the storage unit 12 (step S1001). Here, the command monitor unit 15 compares the address issued from the control unit 7 with the addresses stored in the storage unit 12. When they match each other, the command monitor unit 15 determines that the acquired command is a command for the invalid function. When the acquired command is not a command for the invalid function, the process ends.

When the acquired command is a command for the invalid function, the command monitor unit 15 transfers the acquired address and data to the invalid function detecting unit 13 (step S1002). The invalid function detecting unit 13 compares the address and data transferred by the command monitor unit 15 with the addresses and data stored in the storage unit 12 (step S1003). As a result of comparison, the invalid function detecting unit 13 determines whether or not the function set by a user is invalid (step S1004). When the function set by a user is not invalid, the invalid function detecting unit 13 determines that the function is valid and sends information indicating the determination result to the control unit 7 (step S1005).

On the other hand, when the function set by a user is invalid, the invalid function detecting unit 13 determines that the function is invalid and sends information indicating the determination result and information indicating the function to the control unit 7 (step S1006). The control unit 7 determines the invalid function based on the information transmitted from the invalid function detecting unit 13. Then, the control unit 7 determines whether or not exception processing corresponding to the function stops the operation of the imaging apparatus 100 and the imaging apparatus 100 is disabled (step S1007). In the present embodiment, exception processing corresponding to each function is determined in advance, information indicating exception processing corresponding to each function is stored in the storage unit 12. When exception processing is processing for disabling the imaging apparatus 100, the control unit 7 turns the power of the imaging apparatus 100 OFF to thereby stop the operation of the imaging apparatus 100 (step S1008). Then, a user becomes unable to use the imaging apparatus 100.

On the other hand, when exception processing is not processing for disabling the imaging apparatus 100, the control unit 7 determines whether or not exception processing is processing for correcting the setting value by the control unit 7 (step S1009). When exception processing is processing for correcting the setting value by the control unit 7, the control unit 7 changes the setting value set by a user to a predetermined value (step S1010). Then, the control unit 7 displays warning information indicating the fact that the setting value set by a user has changed to a predetermined value on the display unit 6 (step S1011).

When exception processing is not processing for correcting the setting value by the control unit 7 in step S1009, the control unit 7 executes warning processing for notifying a user of the fact that the user setting has been invalidated because of the settings of the invalid setting values (step S1012). In the present embodiment, for example, a warning message or the like is displayed on the display unit 6. By providing such a warning message, a user can be notified that the function set by the user has been invalidated.

For example, a description will be given of the case where command information shown in FIG. 11A is stored in the storage unit 12.

When a user sets a shutter speed to a 1/8000 sec, the control unit 7 transmits a command including the address 0x20000000 and its data 0x00306000 for setting a shutter speed to the shutter speed setting unit 1b. The command monitor unit 15 acquires the address and data and determines that the address 0x20000000 is the address stored in the storage unit 12. Thus, the command monitor unit 15 transfers the address 0x20000000 and its data 0x00306000 to the invalid function detecting unit 13. The invalid function detecting unit 13 compares the transferred address 0x20000000 and data 0x00306000 with the addresses and data stored in the storage unit 12.

Since the transferred address and data match the values shown in FIG. 11A, the invalid function detecting unit 13 notifies the control unit 7 of information indicating that there is an invalid function and a shutter speed setting is also invalid. Consequently, the control unit 7 provides a warning notice that the setting is invalid or executes exception processing for stopping the operation of an imaging apparatus.

Thus, according to the seventh embodiment, execution of the processing in accordance with the setting value set by improper firmware may be prevented. In the present embodiment, before a user provides an imaging instruction or a reproducing instruction, the user can be notified of the fact that an invalid setting has been made.

In the present embodiment, the command monitor unit 15 transfers the address and data output from the control unit 7 to the invalid function detecting unit 13. When the address issued from the control unit 7 is the one related to an invalid function, the command monitor unit 15 may also read out data from a function block from which a command has been issued and then transfer the read data together with the corresponding address to the invalid function detecting unit 13.

(Eighth Embodiment)

Next, a description will be given of an eighth embodiment of the present invention. Also in the present embodiment, the configuration of the imaging apparatus 100 and the basic processing are the same as those in the seventh embodiment. As in the sixth embodiment, in the present embodiment, the control unit 7 executes processing shown in FIG. 8 at power on to thereby write the address of an invalid function and data for an invalid value to the storage unit 12. Then, as in the seventh embodiment, the control unit 7 executes processing shown in FIG. 10 when a command relating to the invalid function is issued from the control unit 7.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-099271 filed Apr. 24, 2012, and Japanese Patent Application No. 2013-039482 filed Feb. 28, 2013 which are hereby incorporated by reference herein in their entirety.

What is claimed is:

1. An electronic device comprising:
a control unit configured to operate in accordance with software and issue a command for setting a function in accordance with the function of the electronic device being set by a user;
an execution unit configured to execute the function in response to the command issued by the control unit;
a storage unit configured to store information relating to an invalid function; and
a detection unit configured to detect, based on the information stored in the storage unit, that the command, which is issued by the control unit, for the function set by the user is a command for setting the invalid function,
wherein the control unit controls the execution unit so as not to execute the function set by the user in response to the detection by the detection unit that the command, which is issued by the control unit, for the function set by the user is a command for setting the invalid function,
wherein the electronic device further comprises:
a memory configured to store the software; and
an updating unit configured to update the software stored in the memory;
wherein the control unit operates in accordance with the updated software stored in the memory, and
wherein the information relating to an invalid function stored in the storage unit is not changed by the update of the software.

2. The electronic device according to claim 1, further comprising:
a transmitting unit configured to read the command from the execution unit and transmit the read command to the detection unit.

3. The electronic device according to claim 1, wherein the detection unit determines whether or not each of a plurality of commands issued by the control unit is a command for setting an invalid function.

4. The electronic device according to claim 1, further comprising:
a transmitting unit configured to transmit the command issued by the control unit to the detection unit in response to the issuance of the command by the control unit,
wherein the detection unit detects that the command transmitted by the transmitting unit is a command for setting the invalid function.

5. The electronic device according to claim 1, wherein the detection unit determines whether or not the command issued by the control unit is a command for setting the invalid function by comparing the command issued by the control unit with information stored in the storage unit.

6. The electronic device according to claim 5, wherein the control unit issues a plurality of commands for setting one function, and the detection unit determines whether or not the command issued by the control unit is a command for setting the invalid function by comparing the plurality of commands issued by the control unit with information relating to the plurality of invalid functions.

7. An electronic device comprising:
a control unit configured to operate in accordance with software and issue a command for setting a function in accordance with the function of the electronic device being set by a user;
an execution unit configured to execute the function in response to the command issued by the control unit;
a storage unit configured to store information relating to an invalid function; and
a detection unit configured to detect, based on the information stored in the storage unit, that the command issued by the control unit is a command for setting the invalid function,
wherein the storage unit stores additional information for determining whether or not information relating to the plurality of invalid functions is valid,
wherein the detection unit detects that the command issued by the control unit is a command for setting the invalid function based on information relating to a function which is indicated as invalid by the additional information and
wherein the control unit controls the execution unit so as not to execute the function set by the user in response to the detection by the detection unit that the command issued by the control unit is a command for setting the invalid function.

8. The electronic device according to claim 1, wherein the storage unit stores information relating to the condition of a magnitude relation between information relating to the invalid function and data included in the command, and the detection unit determines whether or not the command issued by the control unit is a command for setting the invalid function based on the result of comparison between the data included in the command issued by the control unit and the information relating to the invalid function stored in the storage unit and the condition of the magnitude relation.

9. The electronic device according to claim 1, wherein each of the command issued by the control unit and the information relating to the invalid function stored in the storage unit is data consisting of a plurality of bits, the storage unit stores information for masking a part of the plurality of bits, and the detection unit determines whether or not the command issued by the control unit is a command for setting the invalid function by comparing the bits other than the part of the plurality of bits in the command issued by the control unit with the information relating to the invalid function stored in the storage unit.

10. The electronic device according to claim 1, wherein the control unit stores information indicating the invalid function in the storage unit by executing the software.

11. The electric device according to claim 7, wherein the control unit changes, in accordance with an instruction from a user, the information stored in the storage unit so as not to indicate the invalid function by changing the additional information stored in the storage unit.

12. An imaging apparatus comprising:
a control unit configured to operate in accordance with software and issue a command for setting a function in accordance with the function of the imaging apparatus being set by a user;
an execution unit configured to execute the function in response to the command issued by the control unit;
a storage unit configured to store information relating to an invalid function; and
a detection unit configured to detect, based on the information stored in the storage unit, that the command, which is issued by the control unit, for the function set by the user is a command for setting the invalid function,
wherein the control unit controls the execution unit so as not to execute the function set by the user in response to the detection by the detection unit that the command, which is issued by the control unit, for the function set by the user is a command for setting the invalid function,
wherein the imaging device further comprises:
a memory configured to store the software; and
an updating unit configured to update the software stored in the memory;
wherein the control unit operates in accordance with the updated software stored in the memory, and
wherein the information relating to an invalid function stored in the storage unit is not changed by the update of the software.

13. The imaging apparatus according to claim 12, wherein the control unit causes the detection unit to execute detection processing in response to an imaging instruction.

14. The imaging apparatus according to claim 13, further comprising:
a transmitting unit configured to read the command from a register corresponding to the execution unit in response to the imaging instruction and transmitting the read command to the detection unit.

15. The imaging apparatus according to claim 13, wherein the detection unit determines whether or not each of a plurality of commands issued by the control unit is a command for setting an invalid function in response to the imaging instruction.

16. The imaging apparatus according to claim 12, further comprising:
a transmitting unit configured to transmit the command issued by the control unit to the detection unit in response to the issuance of the command by the control unit,
wherein the detection unit detects that the command transmitted by the transmitting unit is a command for setting the invalid function.

17. The imaging apparatus according to claim 12, wherein the detection unit determines whether or not the command issued by the control unit is a command for setting the invalid function by comparing the command issued by the control unit with information stored in the storage unit.

18. The imaging apparatus according to claim 12, wherein the execution unit includes an imaging unit, a processing unit that processes an image signal obtained by the imaging unit, and a recording and reproducing unit that records an image signal obtained by the processing unit in a recording medium and reproduces an image signal from the recording medium.

19. An imaging apparatus comprising:
a control unit configured to operate in accordance with software and issue a command for setting a function in accordance with the function of the imaging apparatus being set by a user;
an execution unit configured to execute the function in response to the command issued by the control unit;
a storage unit configured to store information relating to an invalid function; and
a detection unit configured to detect, based on the information stored in the storage unit, that the command issued by the control unit is a command for setting the invalid function,
wherein the storage unit stores additional information for determining whether or not information relating to the plurality of invalid functions is valid,
wherein the detection unit detects that the command issued by the control unit is a command for setting the invalid function based on information relating to a function which is indicated as invalid by the additional information, and
wherein the control unit controls the execution unit so as not to execute the function set by the user in response to the detection by the detection unit that the command issued by the control unit is a command for setting the invalid function.

20. The imaging apparatus according to claim 19, wherein the control unit changes, in accordance with an instruction from a user, the information stored in the storage unit so as not to indicate the invalid function by changing the additional information stored in the storage unit.

* * * * *